United States Patent [19]

Douglas et al.

[11] Patent Number: 4,853,617
[45] Date of Patent: Aug. 1, 1989

[54] APPARATUS HAVING CAPACITIVE SENSOR AND METAL DETECTOR FOR DETECTING OBJECTS CONCEALED BEHIND SURFACES

[76] Inventors: Keith Douglas, 41 Grainger Avenue, Godmanchester, Huntingdon, Cambridgeshire; Mark Q. Meyer, 21 Cedar Close, Grafham, Huntingdon, Cambridgeshire, both of United Kingdom

[21] Appl. No.: 172,628
[22] PCT Filed: Mar. 24, 1987
[86] PCT No.: PCT/US87/00666
§ 371 Date: Nov. 19, 1987
§ 102(e) Date: Nov. 19, 1987
[87] PCT Pub. No.: WO87/06010
PCT Pub. Date: Oct. 8, 1987

[30] Foreign Application Priority Data

Mar. 27, 1987 [GB] United Kingdom ................ 8607747

[51] Int. Cl.[4] .................... G01R 33/00; G01R 27/26; G01V 3/11
[52] U.S. Cl. .................... 324/67; 324/61 R; 324/329
[58] Field of Search .................... 324/61 R, 61 P, 67, 324/207, 226, 227, 239, 326, 329; 340/551, 562, 870.37

[56] References Cited

U.S. PATENT DOCUMENTS

| | | | |
|---|---|---|---|
| 3,609,735 | 9/1972 | Dauterman et al. | 324/61 R X |
| 3,764,819 | 10/1973 | Muller | 340/562 X |
| 4,464,622 | 8/1984 | Franklin | 324/67 |
| 4,686,454 | 8/1987 | Precukonis | 324/67 |
| 4,743,902 | 5/1988 | Andermo | 340/562 X |

FOREIGN PATENT DOCUMENTS

| | | | |
|---|---|---|---|
| 3235535 | 3/1984 | Fed. Rep. of Germany | 324/326 |
| 3600446 | 7/1987 | Fed. Rep. of Germany | 324/67 |
| 818740 | 8/1959 | United Kingdom | 324/67 |
| 87/00933 | 2/1987 | World Int. Prop. O. | 324/329 |

Primary Examiner—Gerard R. Strecker

[57] ABSTRACT

A device for detecting concealed objects behind a surface, the device being intended in use to be held near and passed over the surface. The device detects changes in the dielectric constant of the surface resulting from the presence of concealed objects, and also includes metal detector means. The design precludes interference between the two kinds of sensors.

8 Claims, 6 Drawing Sheets

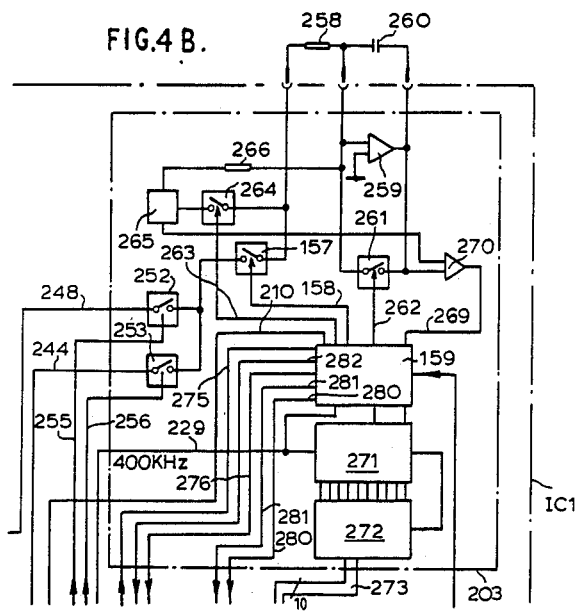

APPARATUS HAVING CAPACITIVE SENSOR AND METAL DETECTOR FOR DETECTING OBJECTS CONCEALED BEHIND SURFACES

This invention relates to a device for detecting objects behind a surface.

Concealed metal objects behind surfaces may be investigated by metal detectors that work by magnetic induction between associated transmitter and receiver coils, e.g. on the so-called balanced inductor principle. Metal detectors that work in this way include those described in U.S. Pat. Nos. 2,451,596 (Wheeler), 2,547,407 (Nelson), 2,557,994 (Ostlund), 2,772,394 (Bradley), 3,882,374 (McDaniel) and 4,255,711 (Thompson) and in German Patent Specification No. 2718132 (Reiners).

Inhomogeneities in the dielectric properties of surfaces may also be investigated by capacitance sensing, in order to detect moisture, concealed voids or concealed objects as described in U.S. Pat. Nos. 2,718,620 (Howe), 2,885,633 (Cook), 3,043,993 (Maltby), 3,046,479 (Mead et al), 3,230,519 (Metz et al), 3,493,854 (Zurbrick), 3,515,987 (Zurbrick et al), 3,694,742 (Berginanis), 3,967,197 (Anderson) and 4,099,118 (Franklin) and UK Patent Specification Nos. 1052194 (Associated Electrical Industries) and 1403720 (Fisons).

A problem in the production of a compact device that can investigate surfaces both capacitively and by magnetic induction is that these two kinds of sensors interfere one with another.

The present invention provides a device for detecting objects behind a surface comprising a support intended in use to be held adjacent and traversed over the surface, transmitter and receiver plate means of stray field capacitor means responsive to alterations in dielectric constant of the surface resulting from the presence of concealed objects and transmitter and receiver coils of metal detector means located behind the plates of the stray field capacitor means, wherein electrostatic screen means is positioned between the plates of the stray field capacitor means and the coils of the metal detector means and connected to a steady reference potential, and the plates of the stray field capacitor means and electrostatic screen means have a combination of electrical conductivity and area perpendicular to the magnetic field from said metal detector means providing continuous conductive paths such that circulating currents induced therein by a magnetic field from the metal detector means are small and the plates of the stray field capacitor means and electrostatic screen means do not prevent operation of the metal detector means.

One approach to shield and plate design is to use a resistive non-metallic material. Thus the plates of the stray field capacitor means and the electrostatic screen means may be derived from conductive ink and have a surface resistance that permits electrostatic charging and discharging thereof whilst not responding to magnetic field from the metal detector means by having large circulating currents induced therein. Alternately the shield and plates could be of metal or other conductive material but divided into narrow strips to minimise the area perpendicular to the magnetic field from the metal detector means and enclosed by continuous conductive paths.

The invention also provides a device for detecting objects behind a surface comprising a support intended in use to be held adjacent and traversed over the surface, a multiplicity of capacitor plate means at intervals along the support, circuit means for sensing for each plate means for alterations in dielectric constant of a local region of the surface and a plurality of display elements arranged at intervals along display means and each associated with a plate means so that each element changes in appearance depending upon the dielectric constant of the local region of the associated plate means so that as the support is traversed past an object the display elements change appearance according to the positions of their associated plate means relative to the object and edges of the object are imaged on the elements.

The invention enables a multiplicity of capacitor sensor plates disposed in an array to provide a pictorial image of an object concealed behind a surface such as a wall by means of display having elements associated with each plate that change visible state with change in local dielectric constant of the surface adjacent each plate. If the concealed object is narrower than the span of the capacitor plates and is approximately centralised, both edges may be seen on the display; otherwise one edge will pass the display followed by the other.

In a particularly advantageous arrangement the required electronic circuits are divided between an application specified integrated circuit (ASIC) and a microcomputer chip, the ASIC generating signals for the stray field capacitive detector and for the inductive metal detector and processing the received signals under the control of the microcomputer to provide a digitised output therefor.

Preferably the circuit includes capacitor transmitter plate means on the support connected to signal generating means and capacitor receiver plate means are connected one after another by multiplexer means to signal receiving means arranged to detect altered signal reception from the transmitter plate means as a result of local alterations in dielectric constant. For more effective penetration of the sensing field behind a surface such as a wall guard plate means is connected to a steady reference potential surrounding said multiplicity of capacitor receiver plate means and serving to partially shield the said plate means from the transmitter plate means. Instances of the use of stray field capacitors in other forms of capacitive sensing are to be found in U.S. Pat. Nos. 3,515,987 (Zurbrick et al), 3,493,854 Zurbrick) and 2,718,620 (Howe). A three electrode moisture detector operating at radio frequencies is described in U.S. Pat. No. 3,811,087 (Howe).

Conveniently a multiplicity of electrodes is defined by a plurality of conductive strips on a circuit board in contiguous side by side relationship with transmitter plate means extending perpendicular to the conductive strips at least one end thereof and the capacitor receiver plate means and the transmitter plate means are printed in conductive inks on a flexible circuit board support.

The transmitter frequency of the stray field capacitor is preferably about 50 KHz which has been found to give an optimal compromise between relative insensitivity to moisture within the dielectric desiring a higher frequency and the use of readily available electronics desiring a lower frequency.

Advantageously at least some of the capacitor receiver plates provide an input through the multiplexer means to second detector channel means arranged selectively to pass line mains frequency, the detector means being responsive to detected line mains frequency and a corresponding area of the display being activated.

According to a further preferred feature of the invention transmitter and receiver coils of metal detector means are placed adjacent a side of the support remote from the intended surface, the transmitter coil being driven by said signal generating means and said receiver coil being fed through filter means and amplifier means to the signal receiving means.

BRIEF DESCRIPTION OF THE DRAWINGS

An embodiment of the invention will now be described, by way of example only, with reference to the accompanying drawings, in which:

FIGS. 4A-4C are a block diagram of a special purpose integrated circuit chip forming part of the circuit of FIG. 3.

DETAILED DESCRIPTION OF PREFERRED EMBODIMENT

Figure 1:
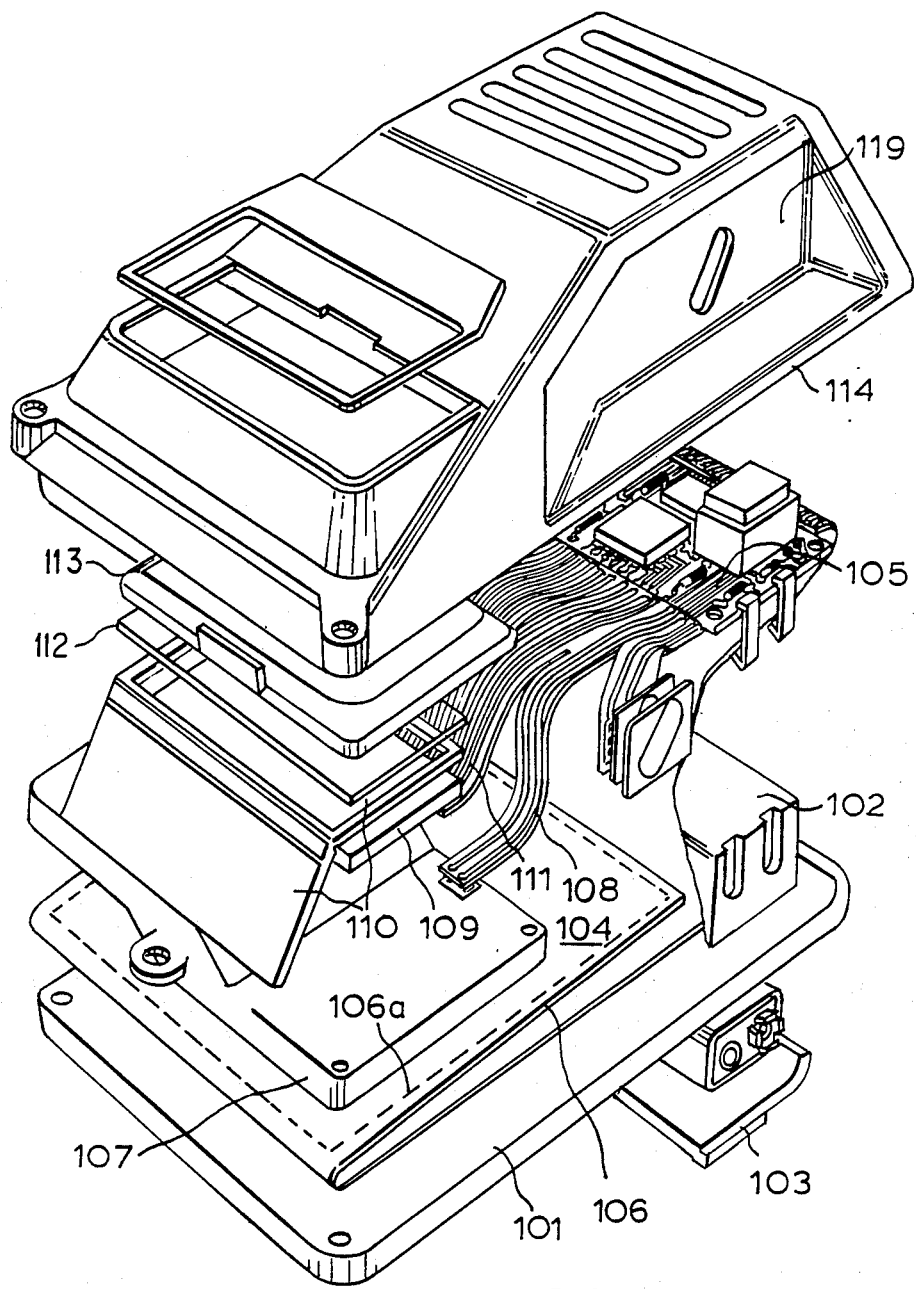
FIG. 1 is a diagrammatic exploded view of an object detector according to the invention.

In the drawings, a case has a base moulding 101 with a planar lower face in which is formed a battery compartment 102 closed by a door 103. A flexible capacitive electrode-carrying circuit board 104 is connected to a main circuit board 105 and fits onto a concealed face of base moulding 101. It has a reverse folded limb 106 spaced preferably not less than 0.5 mm behind a lower capacitive sensor bearing limb thereof and preferably at a spacing of about 2 mm that may be maintained by electrical spacer means. The limb 106 is coated at 106a with an ink of controlled conductivity to define the electrostatic screen means. An inductive metal detector 107 assembly comprising a pair of metal detector coils 130, 131 (FIG. 3) on a plastics former is connected by flexible leads 108 to the board 105. The detector is intended to be a hand-held device compact enough to go into a toolbox, and for this reason it is important that the metal detector assembly 107 can fit behind the board 104 rather than the two having to exist in side by side relationship. A liquid crystal display 109 connected by leads 111 to board 105 is protected from vibration by elastomeric mount 110 and fits behind window 112. A sliding cover 113 of top moulding 114 protects the window 112. The sides of the moulding 114 are indented at 119 to encourage the user to grip the detector in a predetermined way with his fingers and thumb in substantially the same position on each occasion of use. This also enables a connection to be made either capacitively or directly to the user.

Figure 2:
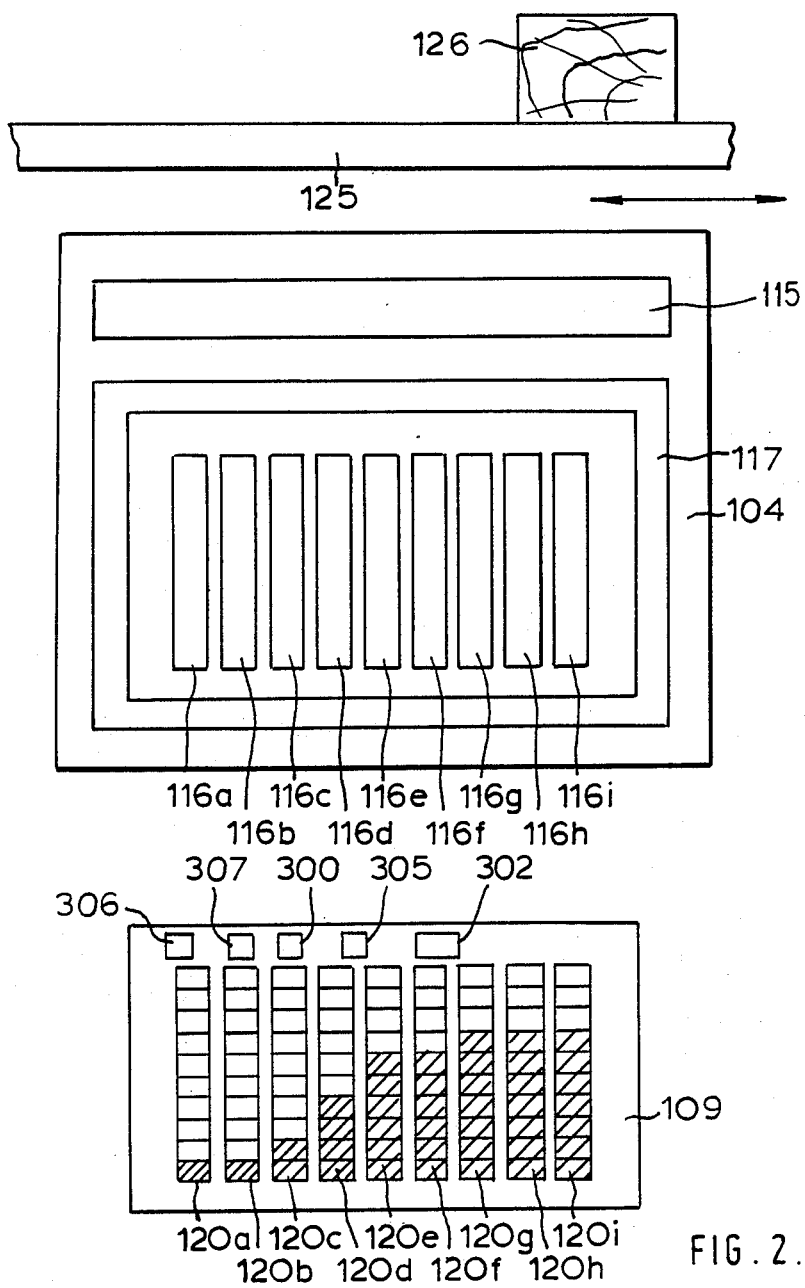
FIG. 2 is a view of a capacitive sensor plate area of a capacitive sensor board forming part of the detector of FIG. 1 and its relationship with a liquid crystal display forming part of the detector.

FIG. 2 shows the capacitive plate arrangement on a front or lower limb of the board 104 and its relationship to the display 109. The electrodes on board 104 are employed in a stray-field capacitor configuration with a transmitter plate 115 separated from a linear array of nine receiver plates 116a-116i by a guard plate 117 that surrounds the plates 116a-116i and intervenes between the transmitter and receiver plates. The guard plate 117 isolates the receiver plates 116a-116i and ensures that the major part of the field reaching them has taken a circuitous path through the material being sensed, increasing the depth at which a wooden stud 126 or other object concealed behind a wall 125 will significantly influence the strength of signal received at a receiver plate by altering perceived local dielectric constant. In the display 109 each plate 116a-116i has an associated bar-type display segment 120a-120i each consisting e.g. of 10 sub-segments in a strip which are caused to change state one after another according to the strength of signal received at its respective associated receiver plate 116a-116i. As the electrodes are scanned across the wall 125 past a wooden stud 126, the presence of the stud 126 increases the current flowing from transmitter plate 115 to receiver plates 116e-116i nearest it, resulting in a corresponding state change in the display segments 120e-120i. The values in each segment will change as the detector is scanned across a wall, so that the user sees the approach of the stud 126, its travel across the electrode array 116a-116i and its departure therefrom.

In order to provide a device of appropriately compact dimensions the receiver plates 116a-116i are made as small as possible and in a typical embodiment they are 7.5 mm wide and 50 mm long. Further reduction of plate size results in received signals that are too weak to handle conveniently with the transmitter and detector circuit described below. The transmitter plate 115 spans the ends of the plates 116a-116i and its width is not critical and can typically be 10-50 mm with little effect on performance. The spacing between transmitter plate 115 and receiver plates 116a-116i has been found to influence performance significantly. Spacings in the range 10-50 mm have been evaluated and a value of 15 mm has been found to be the optimum, with performance falling to approximately half at values of about 7.5 mm and 30 mm. The guard plate 117 serves to isolate receiver plates 116a-116i from field from transmitter plate 115 taking a path across the surface of board 104 which would result in a large offset making the variations in received signal resulting from change in dielectric constant of the surface under test difficult to measure. The plate 117 is preferably not wide, and a width of 2-3 mm will normally be sufficient.

The ability to position metal detector coils 130, 131 in material 107 behind the plates 116a-116i is important to the production of a compact device but a capacitive sensor and an inductive metal detector have until now been difficult to combine in this way. The plates 116a-116i, 115 and 117 cannot be of continuous metal otherwise operation of transmitter coil 130 will give rise to a current flow in them that will be sufficient to alter the field at receiver coil 131 and useful signals from metal objects behind the test surface will be difficult to obtain. Conductivity must, however, be sufficient to enable the plates to act as elements of a capacitive sensor. We have determined that the plates should be of a material that when deposited on the substrate at the intended thickness gives a resistance of 200-2000 ohms per square preferably about 1000 ohms per square. Screen printable polymer thick film inks based on graphite, for example Mattheylec R 4000 contains particles of graphite in an epoxy resin), are satisfactory whereas silver-containing inks are usually too conductive. The plates 115, 116a-116i and 117 likewise need to be screened from the metal detector coils and for this purpose the back face of board 104 is printed with one or more plates of conductive ink that provide an electrostatic screen behind the sensor plate, such screen plate or plates being connected to a constant ground potential. A single electrostatic screen plate may be satisfactory or it may be desirable to use a number of plates defining a segmented screen in order to avoid the effects of voltage drop.

Figure 3:
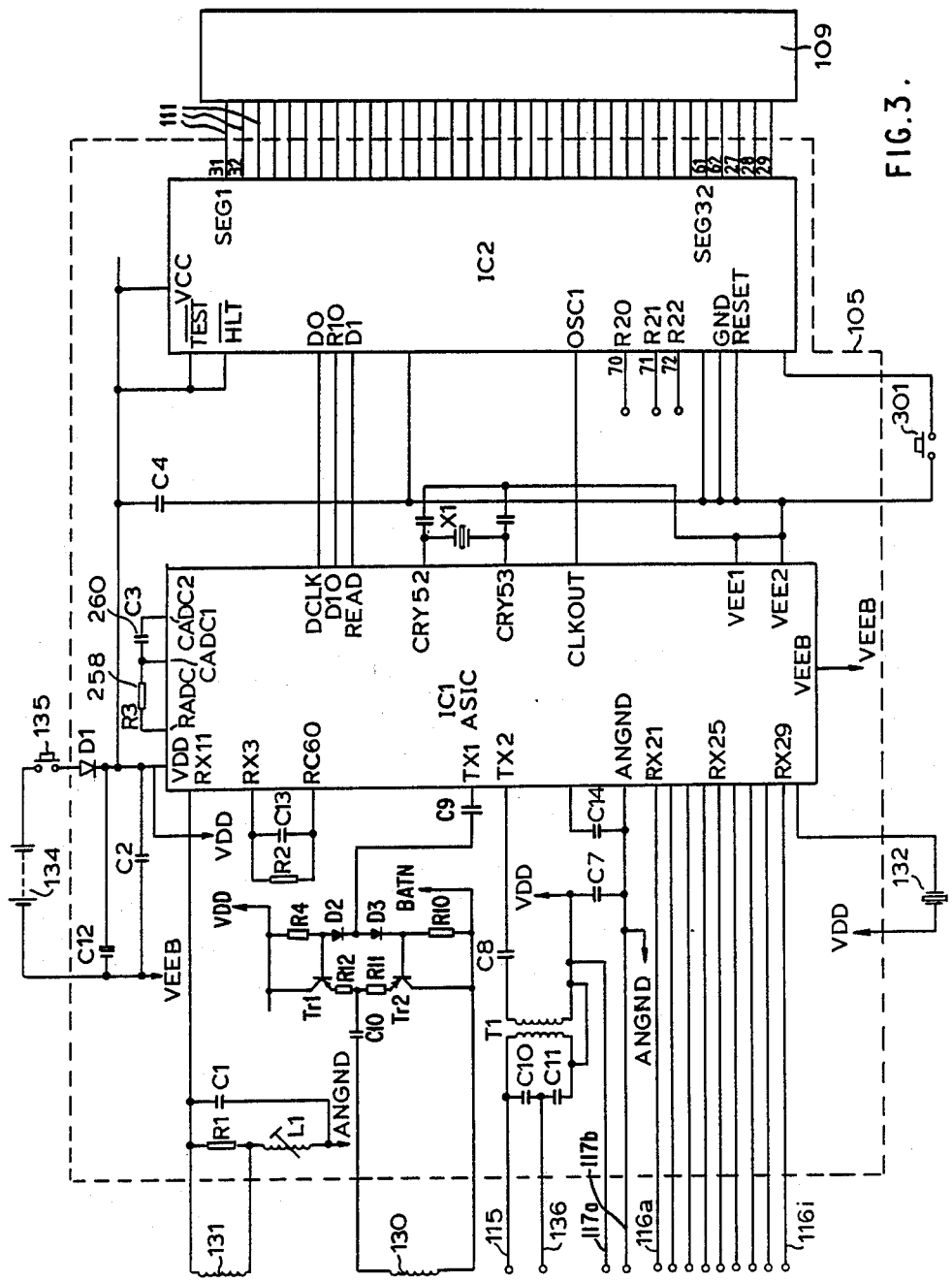
FIG. 3 is a circuit diagram of the detector.

In FIG. 3, circuit board 105 is connected to the metal detector transmitter coil 130 and receiver coil 131, to capacitive sensor transmitter plate 115, to receiver plates 116a–116i and to guard plate 117. Other peripheral devices include buzzer 132, mode change switch 301 and display 109. The board 105 is powered from battery 134 through ON/OFF switch 135. The principal components of the board 105 are an application-specified integrated circuit (ASIC) IC1 which is connected to a 4-bit microcomputer IC2 which includes a display controller for the display 109 which it works via pin-outs 27–29, 31–62 and leads 111. The battery voltage is supplied from pins $V_{MC}$ of IC1 to the input Vcc of microprocessor IC2 to provide power therefor, and microprocessor pins D0, R10 and D1 provide a data clock input, a data line and a data direction line between IC1 and IC2 so that the microcomputer IC2 may control the operation of the ASIC IC1 and receive data therefrom. A resonator X1 is connected across clock oscillator pins OSC1 and OSC2 of the microcomputer IC2 and clock pulses are also fed from the clock oscillator to the uC clock pin of IC1. The plates 116a–116i provide inputs at pins RX21 to RX29 of IC1 and the guard plate 117 is connected via leads 117a, 117b to ground potential output pin ANGRND of IC1 as also is the electrostatic screen between metal detector assembly 107 and plates 115, 116a–116i and 117 of the capacitive sensor. The ANGRND output pin of IC1 is an internally generated analogue ground for connection of an external decoupling capacitor between this pin and BATN. Pulses for the transmitter plate 115 appear at pin TX2 of IC1 and are fed via capacitor C8 to one side of voltage step-up transformer T1, the other side having capacitors C10, C11 connected across it. The output voltage at pin TX2 is limited to 3 volts because of working voltage requirements in IC1 and this is stepped up by T1 to 20 volts to give a stronger received signal at plate 116a–116i. It is difficult to obtain a greater voltage step-up because of limitations on the current available at pin TX2. A user connection 136 is tapped from between C10 and C11. The user connection comes out to the top moulding 114 in a region 119 thereof where the user is caused to place his fingers and will either be a conductive area or will be through the ON/OFF switch. The capacitive sensor will normally detect insulators and electrically isolated conductors but will not detect earthed conductors which divert the field from the transmitter plate 115 rather than returning a stronger signal to receiver plates 116a–116i. It is hoped that user connection 136 to a part of the signal to transmitter plate 115 may avoid this happening and provide some response of the capacitive detector from earthed conductors.

The metal detector transmitter coil 130 is driven from pin TX1 of circuit IC1 via a unity gain push-pull driver network which acts as a current amplifier. Pulses from pin TX1 pass via capacitor C9 and diodes D2, D3 to the bases of transistors TR1, TR2 biased by resistors R9, R10, the transistors having emitter resistors R11, R12 between which an output is fed via capacitor C13 to coil 130. The metal detector receiver coil 131 is connected between pins RX1 and ANGRND of chip IC1 via a resonant filter consisting of inductor L1, resistor R1 and capacitor C1.

Figure 4A:
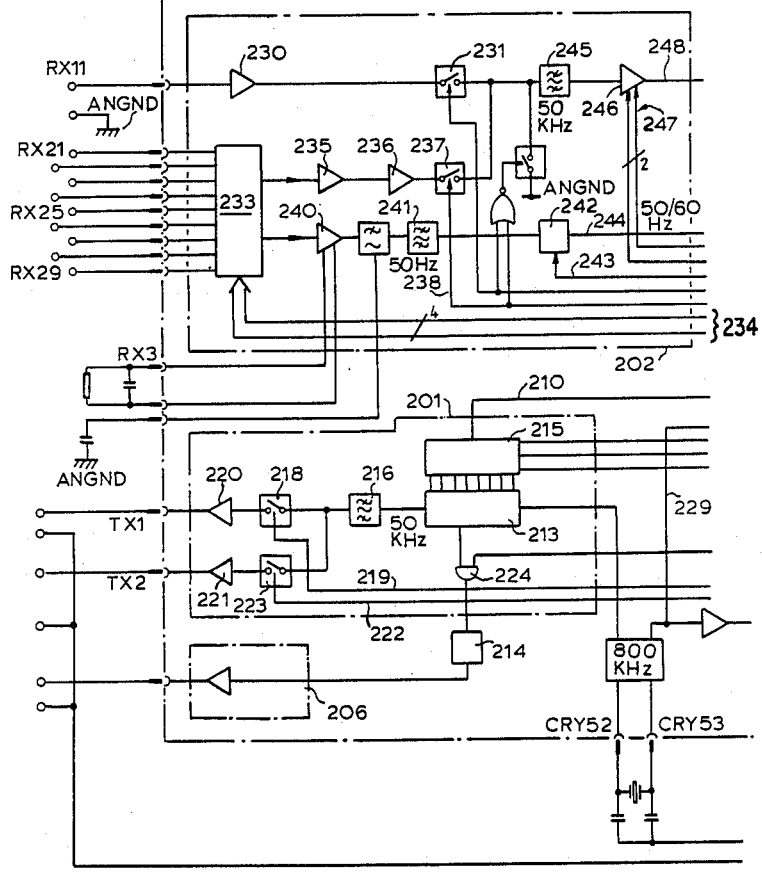
Figure 4C:
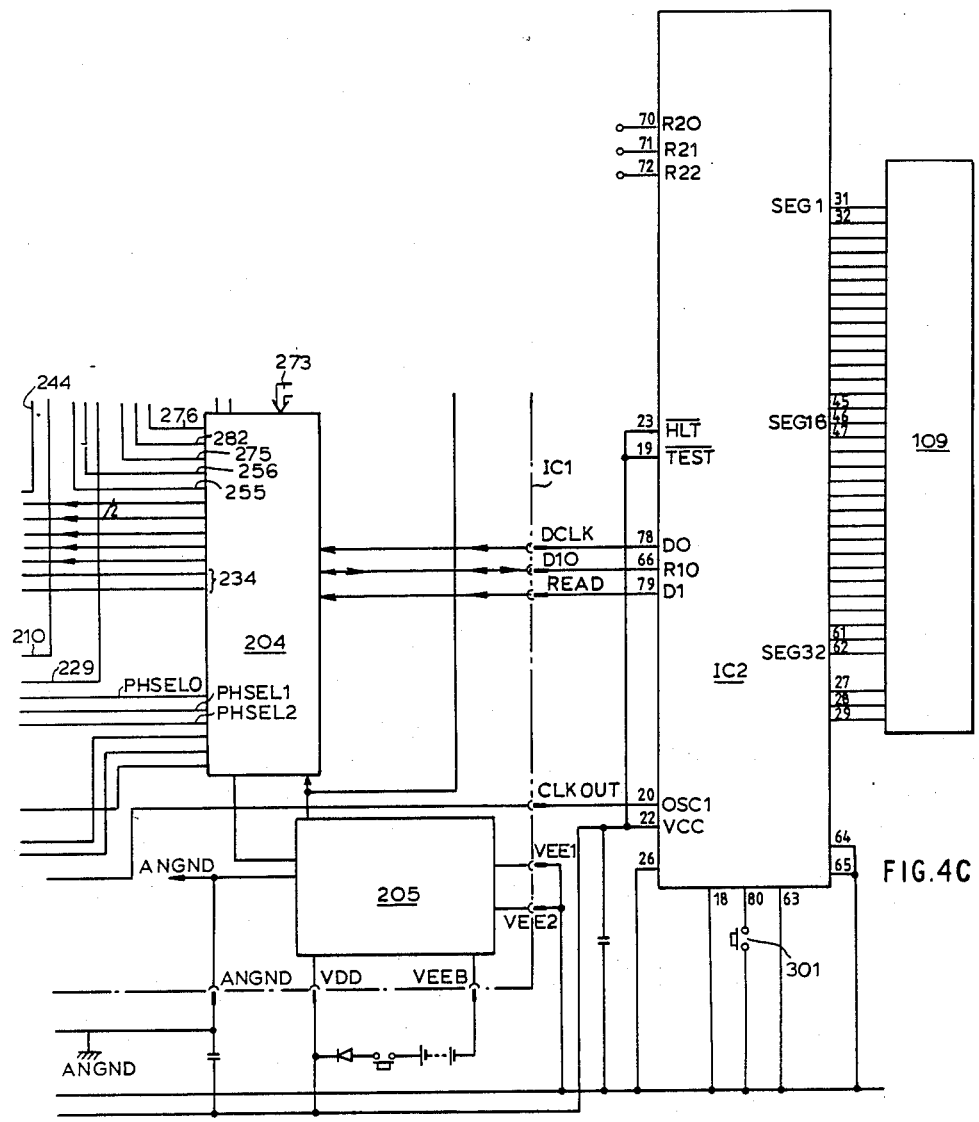

A block schematic of the custom chip IC1 is shown at FIGS. 4A and 4C. Chip IC1 may be divided into a signal generator and transmitter block 201, (FIG. 4A) a receiver circuit block 202, a phase sensitive detector (PSD) and analog to digital converter (ADC) block 203 (FIG. 4B), a decoder block 204 (FIG. 4C), a power supply 205, a buzzer driver block 206 and a test switch matrix 207. The functions of the major blocks will be described below.

Using a 400 KHz clock signal from microcomputer IC2 the block 201 (FIG. 4A) generates drive signals for the metal detector transmitter coil 130 (FIG. 3), the capacitive sensor transmitter plate 115 (FIG. 2) and the buzzer driver 206 (FIG. 4A) and it further provides a reference signal at 210 to the detector and converter block 203. The incoming clock signal on line 211 passes via buffer 212 to divider 213 that generates:

(a) eight 50 KHz square waves of relative phase 0°, 45°, 90° ... 315°. The square wave outputs pass to one of eight selector 215 (FIG. 4) controlled from decoder 204 (FIG. 4C) by a three-bit code in control lines PHSEL 0–PHSEL 2 so as to pass a selected one of the phases as a reference signal in line 210;

(b) a eight point 50 KHz sine wave approximation which is passed to filter 216 that removes residual harmonics. The filtered sine wave is applied through buffer 220 to metal detector transmitter coil 130 when control line 219 from the decoder 204 is active and closes switch 218. Similarly the sine wave is applied to capacitive sensor transmitter plate 115 via buffer 221 when control line 222 from the decoder 204 is active to close switch 223. Thereby the microcomputer IC2 may selectively operate the capacitive sensor and/or the metal detector. Normally control lines 219, 222 are not active simultaneously, but a state where both lines are active is not forbidden and may occur momentarily during transition between states of switches 218, 223; and (c) via AND gate 224 and divider 214 a 1.56 KHz squarewave buzzer drive signal is passed to buzzer driver 206. Gate 224 is enabled when control line 225 from decoding logic 204 is active.

The 400 KHz clock signal i also passed from the output side of buffer 212 via line 229 to the PSD and ADC block 203.

The receiver block 202 (FIG. 4A) receives and conditions signals from the receiver coil 131 (FIG. 3) and from the receiver plates 116a–116i (FIGS. 2 and 3) prior to processing in PSD and block 203. The receiver coil 131 is connected between pin RX11 and GRND which define inputs to receiver amplifier 230 of impedance about 1 megohms at 50 KHz. The received signal may have a voltage of about 200 millivolts RMS at 50 KHz. The input signal at RX11 will contain a predominant 50 KHz signal and harmonics, but there may also be a 50/60 Hz signal present. It passes to amplifier 230 whose gain may be set by control from the microcomputer IC2. The output of amplifier 230 passes to switch 231 which is closed when line 232 from decoding logic 204 is active.

Signals from the capacitive sensor receiver plates 116a–116i pass via inputs RX21-RX29 into the receiver block 202. The current received in each line at 50 KHz enables changes in the dielectric constant of material on the concealed face of a wall over which the sensor is traversed to be determined, a change in current flowing between each receiver plate 116a–116i and transmitter plate 115 of about 1 nanoamp peak to peak corresponding to a change of one count at the ADC output counter 271 of block 203. Plates 116a–116i can pick up noise signals from mains cables, fluorescent tubes and other external sources but the noise is effectively filtered out by filter 245 and also at the PSD and ADC block 203 whose response is centered on a narrow band at about 50 KHz and its odd harmonics. Noise in this band is expected to be significantly less than 1 nanoamp under normal circumstances. The capacitance being measured may typically have a value in the range 3-40 femto farads. In a second mode drives to both transmitter coil 130 and transmitter plate 115 are disabled and measurement is made of a 50/60 Hz component of the input current, the signal typically giving rise to an AC current at that frequency of 15 nanoamps peak to peak. The lines RX21-RX29 pass into an analog multiplexer 233 controlled by four select lines 234 from the decoding logic 204, the state of lines 234 selecting one of the nine possible input lines. Depending upon the particular input and the selector signal in lines 234 the sensor signal is connected to one of two inputs or to analog ground. A first output from multiplexer 233 passes to current to voltage converter 235 responsive to signals at 50 KHz and the resulting voltage is further amplified at 236 and passes to switch 237 which is closed when control line 238 from decoding logic 204 is active, only one of lines 232 and 238 being active at any given time. Gain of amplifier 236 may be set by a digital code from the microcomputer IC2. A second output from multiplexer 233 for inputs RX24, RX25, RX26 passes to a second current to voltage converter 240 responsive to signals at 50/60 Hz, the output passing through bandpass filter 241 which passes signals at 50/60 Hz. The output of filter 241 passes to peak detector 242 which provides a measure of the amplitude of the 50/60 Hz component. The peak detector is cleared at the start of each measurement cycle when line 243 from decoding logic 204 is active, and a DC output at line 244 is passed to PSD and ADC block 203. The output of switches 231, 237 is either a signal from the metal detector coil 131 or from the particular receiver plate 116a-116i selected by multiplexer 233 and is connected to bandpass filter 245 of centre frequency 50 KH. The output of filter 245 is amplified at a dual gain stage 246 whose gain is adjusted depending on the state of line 247 from decoding logic 204, and a received signal output is fed at line 248 to PSD and ADC block 203.

The PSD and ADC block 203 (FIG. 4B) receives a battery voltage signal at voltage generator 265, a received signal at line 248 from the metal detector or capacitive detector and a line mains amplitude signal at line 244 which are respectively passed through switches 251-253 when a selected one of lines 154-256 from decoding logic 204 is active. The output of the three switches are fed to PSD switch 157 which is controlled by line 158 from control logic 159 which receives the 400 KHz clock at line 229. The output of switch 157 is fed via resistor 258 to the inverting input of operational amplifier 259 across which capacitor 260 is connected to provide an integrator, the non-inverting input of amplifier 259 being connected to ground. On closure of switch 157 capacitor 260 is charged through resistor 258. The capacitor 260 is discharged on closure of switch 261 when line 262 from control logic 159 is active. When line 263 from logic 159 is active, switch 264 closes to connect voltage generator 265 to the input resistor 258 of to operational amplifier 259, the voltage from generator 265 providing a reference signal. The output from integrator 259, 260 is fed to comparator 270 whose output at 269 is input to control logic 159. Control signals pass to a ten bit counter 271 whose state can be input to latch 272 whose state can be accessed by microcomputer IC1 via data lines 273 and decoding logic 204.

An inactive to active transition of line 275 between decoding logic 204 (FIG. 4C) and control logic 159 (FIG. 4B) initiates the start of a conversion cycle which is synchronized with the line 210. At the start of the conversion cycle over-range, under-range, start conversion, conversion complete and ramp-up complete latches in control logic 159 are cleared and the counter 271 is reset to zero. The switch 261 is closed to preset the integrator capacitor 260 with a known voltage. A new conversion cycle can be started at any time by making line 275 inactive and then active, the control logic 159 responding to the active edge of the signal. After the conversion has started, it will proceed without intervention from the microcomputer IC2 (FIG. 4C) except where an under-range is signaled at line 276, in which case the cycle is aborted. Switches 252 and 157 are closed so that the voltage on line 248 charges capacitor 260 via resistor 258 for a fixed number of cycles of the 400 KHz clock in 229 counted at counter 271. When the ramp-up of the voltage on capacitor 260 is complete control logic 159 clears counter 271, opens switch 157 and closes switch 264 thereby causing the output voltage of the integrator 259, 260 to ramp down again, the logic 159 latching status line 280 active to indicate at logic 204 that ramp-up is complete. The microcomputer reads the status of the latch controlling line 280 and when the line is active is enabled to change the input signal selection. The counter 271 is clocked by pulses in line 229 during the ramp down phase of the cycle and is stopped by logic 159 when the voltage on capacitor 260 falls below the threshold of comparator 270, Vcomp. The value in counter 271 is now loaded into latch 272 and status line 281 is set to active, allowing the microcomputer IC2 to determine that data can be read. The output voltage reached by integrator 259, 260 during the ramp-up phase of the cycle will depend on the value of the voltage on input line 248. The time for the voltage on capacitor 260 to fall to the threshold Vcomp of comparator 270 at the controlled discharge rate of the ramp down phase of the cycle will therefore depend on the voltage on line 248. The digital value loaded into latch 272 will be a measure of that voltage. The operation at input lines 244, 250 via switches 253, 251 is similar. Accordingly the value in latch 272 can be a measure of battery voltage, 50 KHz current between transmitter and receiver coils 130, 131 of the metal detector, 50 KHz current between transmitter plate 115 and receiver plates 116a-116i of the capacitive sensor or 50/60 Hz current induced in plates 116d-116f by mains line voltage on adjacent electrical wiring. The control logic 159 sets an over-range latch and sets line 282 active at the end of a conversion cycle if the input signal at line 244, 248 or 250 exceeds a maximum full scale input. The under-range latch controlling the state of line 276 set to active if an insufficient input voltage is obtained at line 248 to ramp the voltage of integrator 259, 260 to the threshold of comparator 270 by the end of the ramp-up phase of the cycle, indicating that the input signal on line 248 and the reference signal on line 210 are both of phase and the cycle is aborted. The microcomputer IC2 responds to an active state in line 276 by resetting the phase of the reference signal from selector 215 via lines PHSEL 0-2 to bring the input signal in line 248 and the reference signal in line 210 into the correct phase so that the PSD switch 157 is correctly timer to match an incoming signal at line 248. At start-up, firmware in microcomputer IC2 tests each of the phases that can be set by outputs PHSEL0-PHSEL2 and selects the phase giving the strongest signal. The phase sensitive detector and dual slope A/D converter form a matched filter. The maximum ramp-up time and the ramp-down time are both about 2.5 milliseconds and the maximum time between successive start conversion signals is about 5 milliseconds allowing all 9 plates 116a–116i to be sensed within a cycle time of 100 milliseconds together with a 50-60 Hz input status via plates 116d–116f, a metal detector status and a battery status.

The decoding logic 204 (FIG. 4C) provides a serial data link between the microcomputer IC2 and the custom chip IC1, the DATA line (D10 on FIG. 3) carrying addresses and bidirectional data, the DCLK line carrying clock signals to synchronise data transfers and the READ line providing for control of data direction.

As will be apparent, the device described above performs three major functions:

(i) Universal Object Detector for locating inhomogeneities (e.g. studs, joists, pipes) behind plasterboard, chipboard, wood panels and walls and partitions in buildings;

(ii) Metal Detector for locating metal objects behind non-metallic surfaces;

(iii) Tracing of live cables.

These functions may be implemented in two operating modes. A default mode of operation (at switch on) may be as a universal object finder, where the output of the object detector will be displayed continuously. Referring now to FIG. 2, this function is signalled by indicator zone 306 of display 109. If the battery voltage at line 250 is below a threshold, a low battery warning indicator 305 is activated. If metal is detected in this mode, the microprocessor IC2 will give the user an indication on the display in the form of a flashing segment 300. The user can then, if he wishes, switch to the second mode by pressing switch 201 (function signalled by indicator 307 of display 109) which is a metal display and mains tracing mode in which the output of the metal detector is displayed on the display 109 as a barchart output proportional to received signal intensity. Switching to this second mode provides a filtering function and nonmetallic objects do not affect the display 109.

In the second mode the metal detector 130, 131 will operate and in addition the mains tracing function of electrodes 116d–116f will be activated by multiplexer 233. An indication of the presence of mains will only be given if metal is also detected. The product should be able to indicate the presence of live cables connected to the AC line mains of a voltage greater than 110 V RMS and at a frequency in the range 40 to 100 HZ. Live cables in metal conduits or any other form of electrical shielding cannot be detected. The cable must be live at the time that the product is used, although it need not be carrying a current. The presence of mains will be indicated by a flashing segment 302 on the display and a buzzer 132 will be sounded by driver 206.

A typical detector constructed as described above may be able to locate wooden battens behind 20 mm of plasterboard, 10 mm of plasterboard and 5 mm of plaster or 20 mm of chipboard, and it may be able to find a 14 mm diameter copper pipe behind 10 mm of plasterboard plus 10 mm air gap, 10 mm of plasterboard plus 5 mm of plaster plus 5 mm air gap or 20 mm of chipboard. The metal detector should be capable of finding 2.5 mm$^2$ mains cable at 0–50 mm and 14 mm diameter copper pipe at 0–120 mm, the location of the centre of an object at maximum depth being to within plus or minus 10 mm. The presence of mains may be detectable in a 2.5 mm$^2$ or 1 mm$^2$ cable carrying 240 V RMS behind 10 mm plasterboard plus 5 mm plaster or 5 mm plaster plus 10 mm mortar plus a plastics conduit.

It will be appreciated that the three sensor groups operate independently and without any interaction as far as the user is concerned.

It will be appreciated that modifications may be made to the embodiment described above without departing from the invention, the scope of which is indicated in the appended claims.

We claim:

1. A device for detecting objects behind a surface comprising a support, stray field capacitor means adapted to detect dielectric constant changes, and metal detectors means; said stray field capacitor means including transmitter and receiver plate means and being responsive to differences in the dielectric constant of the surface resulting from the presence of concealed objects behind said surface, and said stray field capacitor means being positioned adjacent an exterior face of said support, said device being intended in use to be held with said capacitor means adjacent to and for traverse along the surface; and said metal detector means comprising transmitter and receiver coils located behind the plates of the stray field capacitors means, said transmitter and receiver plate means being of electrically resistive material.

2. A device according to claim 1, wherein electrostatic screen means comprising at least one plate is positioned between the plates of the stray field capacitor means and the coils of the metal detector means and is connected to a steady reference potential, the or each plate of the electrostatic screen means being of electrically resistive material, the stray field capacitor means including a multiplicity of capacitor receiver plate means at intervals on one face of the support, and the electrostatic screen means being on the other face of the support.

3. A device according to claim 2, wherein the plates of the stray field capacitor means and of the electrostatic screen means are derived from resistive ink and have a surface resistance that permits electrostatic charging and discharging thereof whilst not responding to magnetic field from the metal detector means by having large circulating currents induced therein.

4. A device according to claim 3, further comprising a circuit for sensing alterations in the dielectric constant of a region of the surface local to each receiver plate means resulting from the presence of concealed objects and a plurality of display elements, each arranged adjacent to and each associated with a receiver plate means so that each display element changes in appearance depending upon the dielectric constant of the local region of the associated receiver plate means and as the support is transversed past an object the display elements change appearance according to the positions of their associated receiver plate means relative to the object, and edges of the object are imaged on the elements.

5. A device according to claim 1, and further comprising guard plate means connected to a steady reference potential surrounding the receiver plate means and serving to partially shield the transmitter plate means from the receiver plate means.

6. A device according to claim 3 and further including signal generating means, multiplexer means and signal receiving means arranged to detect altered signal reception from the transmitter plate means as a result of local alterations in the dielectric constant, and wherein the transmitter plate means is connected to the signal generating means.

7. A device according to claim 3 wherein the receiver plate means is defined by a plurality of resistive strips on a circuit board in contiguous, side-by-side relationship with the transmitter plate means wherein the dimensions of each receiver plate are about 7.5 mm by 50 mm, the separation between the transmitter and receiver plates is 7.5 to 30 mm and the electrostatic screen means lies in a plane about 2 mm behind a plane in which the transmitter and receiver plate means lie, the resistive ink containing graphite particles in a resin or binder and the resistance of the plate means and of the screen means being about 200–2000 ohms per square.

8. A device according to claim 1, wherein the detector means responds to 50–60 Hz currents induced in the receiver plate means by line mains to indicate the presence of live electrical cables, and further including control means switchable between a first mode in which the magnitude of signals received by the capacitor receiver plate means is display on display means and a second mode in which the magnitude of signals from the metal detector means is displayed on the display means.

* * * * *